United States Patent Office 2,944,030
Patented July 5, 1960

2,944,030
BINARY EMULSIFIERS

John T. Patton, Jr., Wyandotte, Mich., assignor to Wyandotte Chemicals Corporation, Wyandotte, Mich., a corporation of Michigan No Drawing. Filed May 31, 1957, Ser. No. 662,558

8 Claims. (Cl. 252—356)

This application is a continuation-in-part of U.S. patent application, Serial No. 466,954, filed November 4, 1954, for "Surface Active Agents," now abandoned.

The present invention relates to binary emulsifiers consisting essentially of higher aliphatic acid and rosin acid esters of certain totally hydroxyalkylated alkylene polyamines, and the oxyethylated adducts of these same higher aliphatic acid esters.

The compounds of the present invention are derivatives of certain totally hydroxyalkylated alkylene polyamines. The first class of totally hydroxyalkylated alkylene polyamines used as intermediates in preparing the compounds of the present invention are the totally hydroxypropylated and the totally hydroxybutylated alkylene diamines conforming to the formula:

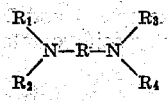

wherein R is an alkylene group containing 2 to 6 carbon atoms, and $R_1$, $R_2$, $R_3$ and $R_4$ are selected from the group consisting of the 2-hydroxypropyl group, the 2-hydroxylbutyl group and the 1-methyl-2-hydroxypropyl group. Typical of the totally hydroxyalkylated alkylene diamines conforming to the above formula is N,N,N',N' tetrakis(2-hydroxypropyl)ethylene diamine. The second class of totally hydroxyalkylated alkylene polyamines used as intermediates in preparing the compounds of the present invention are the totally hydroxypropylated and the totally hydroxybutylated 1,3-diamino-2-propanols conforming to the formula:

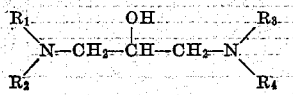

wherein $R_1$, $R_2$, $R_3$ and $R_4$ are selected from the group consisting of the 2-hydroxypropyl group, the 2-hydroxybutyl group and the 1-methyl-2-hydroxypropyl group. A typical example of the compounds conforming to the above formula is N,N,N',N' tetrakis(2-hydroxypropyl) 1,3-diamino-2-propanol. The third class of totally hydroxyalkylated alkylene polyamines used as intermediates in preparing the compounds of the present invention are the totally hydroxypropylated and the totally hydroxybutylated polymers of ethylene diamine and propylene diamine conforming to the formula:

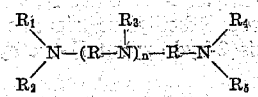

wherein R is an alkylene radical selected from the group consisting of ethylene and propylene radicals, n is an integer not higher than 2, and $R_1$, $R_2$, $R_3$, $R_4$ and $R_5$ are selected from the group consisting of the 2-hydroxypropyl group, the 2-hydroxybutyl group and the 1-methyl-yl-2-hydroxypropyl group. A typical example of a compound conforming to the above formula is

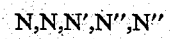

pentakis(2-hydroxypropyl)diethylene triamine. The totally hydroxyalkylated alkylene polyamines used in the synthesis of the compounds of the present invention are readily prepared by condensing propylene oxide, 1,2-butylene oxide or 2,3-butylene oxide or mixtures thereof with an appropriate alkylene polyamine in the presence of water at a temperature of 40–120° C. The quantity of oxide used in the condensation reaction is such as to furnish one mol of oxide for each amino hydrogen of the polyamine.

The higher fatty acid and rosin acid esters of the totally hydroxyalkylated alkylene polyamines of the present invention are prepared by esterifying the totally hydroxyalkylated alkylene polyamine of interest with a fatty acid or rosin acid containing at least 8 carbon atoms in its structure. Hereinafter, for convenience, the above compounds frequently will be referred to simply as "higher esters." Typical of the higher esters coming within the scope of the present invention is the monostearate ester of tetrakis(2-hydroxypropyl)ethylene diamine which has the following chemical structure:

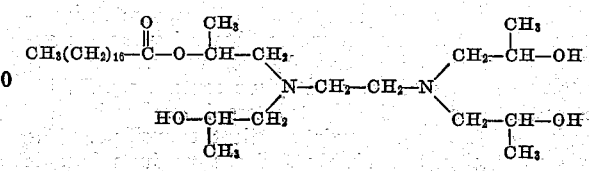

The higher esters may be prepared by conventional esterification techniques as for example by simply heating a higher fatty acid and a totally hydroxyalkylated alkylene polyamine.

Essentially any 8 or higher (about 20 being about the practical upper limit only because of what is available in commercial quantities) carbon atom aliphatic acid or rosin acid may be used in preparing the compounds of this invention. Typical examples of such acids are 2-ethylhexanoic acid, octanoic acid, undecanoic acid, lauric acid, myristic acid, palmitic acid, abietic acid, etc. When an aliphatic acid is used in preparing the compounds of interest, it is preferred to employ acids having a low degree of unsaturation such as stearic and oleic acids except where the ester is to be used as an intermediate in the preparation of surface coating compositions. It is not necessary to use single acids in preparing the desired higher esters as products with desirable properties are obtained from mixtures of acids derived from natural sources such as olive oil, castor oil, cottonseed oil, tall oil, etc.

It will be apparent to those skilled in the art that when a higher fatty acid is esterified with a totally hydroxyalkylated alkylene polyamine it is inevitable that a mixture of products is obtained. For example, when one mol of stearic acid is esterified with N,N,N',N' tetrakis(2-hydroxypropyl)ethylene diamine the predominant product will be the monostearate ester, but the reaction product will contain small amounts of both the distearate ester and unreacted N,N,N',N' tetrakis(2-hydroxypropyl)ethylene diamine and perhaps minor traces of the tri- and tetrastearate esters. For convenience in description in the subsequent discussion of the invention the esterification products will be referred to simply as the mono-, di-, tri- or tetraesters, since such designation identifies the principal constituent of the product. Although individual esters can be isolated by complicated procedures such as repeated molecular distillations, such purification is not required since the esterification products as produced have excellent surface active properties.

The higher esters of the totally hydroxyalkylated alkylene polyamines are lipophilic surface active agents having low HLB numbers as determined by the method of W. C. Griffin, Journal of the Society of Cosmetic Chemists, 1, 419 (December 1949). The higher esters per se have utility as surface active agents in many non-aqueous systems and are also employed in conjunction with their oxyethylated derivatives to form multicomponent emulsifier systems. The simple acid salts of the higher esters, e.g. the hydrochloride and acetic acid salts, are water-soluble and are excellent emulsifiers. These latter emulsifying agents are extremely useful, since emulsions prepared therewith can be easily resolved by simply adding a small quantity of base to the emulsion. The higher esters, particularly the tetraesters, derived from aliphatic acids containing high degrees of unsaturation, e.g. linoleic acid, function as drying oils and may be used in surface coating compositions. The mono- and diesters derived from the highly unsaturated aliphatic acids may be used as intermediates in preparing oil modified alkyd resins.

The oxyethylated adducts of the higher esters of the totally hydroxyalkylated alkylene polyamines are prepared by adding ethylene oxide to the higher esters in the presence of an alkaline catalyst. The solubility characteristics of the oxyethylated adducts depend primarily on the percent oxyethylene content of the adduct and vary from lipophilic essentially water-insoluble products when the oxyethylene content is small to completely water-soluble products such as are obtained when the adduct contains 50% of oxyethyleneg roups. The oxyethylene adducts of low oxyethylene content, e.g. 5–25% somewhat resemble the higher esters themselves in properties and are in the main excellent emulsifiers. The properties change gradually and the products become increasingly more water-soluble as the oxyethylene content of the derivatives is increased. The water-soluble higher oxyethylated esters, e.g. those containing 25–75% of oxyethylene groups, are excellent laundry detergents and have a high loading power for removing oily soils from textiles. Many interesting emulsifying systems can be prepared by combining both a higher ester and an oxyethylated adduct of a higher ester to form binary and even more complex emulsifiers.

The following examples are set forth to more clearly illustrate the principle and practice of the invention to those skilled in the art.

EXAMPLE 1

Part A

A total of 216 grams (1.5 mol) of 2-ethylhexanoic acid, 292 grams (1 mol) of N,N,N',N' tetrakis(2-hydroxypropyl)ethylene diamine and 250 grams of xylene are charged into a 3-neck flask equipped with a stirrer, thermometer, nitrogen bubbler and a reflux condenser to which is attached a decanting head for collecting and measuring the water formed in the esterification. The mixture is refluxed until 18 ml. of water is collected which indicates that the mono-2-ethylhexanoate ester has been formed. The xylene and excess of 2-ethylhexanoic acid are then removed by vacuum distillation. The product is the mono-2-ethylhexanoate ester of N,N,N',N' tetrakis(2-hydroxypropyl)ethylene diamine.

Part B

The di-2-ethylhexanote ester of N,N,N',N', tetrakis(2-hydroxypropyl)ethylene diamine is prepared as described in Part A above except that initially 2.5 mols of 2-ethylhexanoic acid is charged to the reaction and the esterification is continued until 36 ml. of water is collected which indicates the formation of the diester.

EXAMPLE 2

Part A

Stearic acid and N,N,N',N' tetrakis(2-hydroxypropyl) ethylene diamine are charged in an equal molar ratio to the apparatus described in Example 1, Part A, that is modified in that the decanting head is replaced with an ordinary distillation takeoff head. The reaction mixture is heated for approximately 4 hours at reflux temperature and atmospheric pressure and then under vacuum at 160° C. until the reaction is complete. Heating is continued until titration of the reaction mixture indicates that all of the stearic acid has been esterified. The product is the monostearate ester of N,N,N',N' tetrakis(2-hydroxypropyl)ethylene diamine.

Part B

The distearate ester of N,N,N',N' tetrakis(2-hydroxypropyl)ethylene diamine is prepared as described in Part A above except that 2 mols of stearic acid are charged for each mol of the N,N,N',N' tetrakis(2-hydroxypropyl) ethylene diamine.

Part C

The monostearate esters of N,N,N',N' tetrakis(2-hydroxypropyl)-1,3-diamino-2-propanol, N,N,N',N' tetrakis-(2-hydroxybutyl)ethylene diamine and N,N,N',N'',N''', N''' hexakis(2-hydroxypropyl)triethylene tetraamine are prepared as in Part A except for the substitution of the totally hydroxyalkylated alkylene diamine of interest for the N,N,N',N' tetrakis(2-hydroxypropyl)ethylene diamine of Part A.

The tri- and tetra-fatty acid esters can be prepared by the techniques of Examples 1 and 2 by simply increasing the mol ratio of fatty acid to totally hydroxyalkylated alkylene polyamine.

EXAMPLES 3–8

Additional esters of N,N,N',N' tetrakis(2-hydroxypropyl)ethylene diamine are prepared by esterification with lauric acid, oleic acid and tall oil (a mixture of fatty acids and rosin acids). The esters prepared are set forth in Table I.

TABLE I

| Example No. | Ester Prepared |
|---|---|
| 3 | Monooleate. |
| 4 | Dioleate. |
| 5 | Monolaurate. |
| 6 | Dilaurate. |
| 7 | Mono tall oil ester. |
| 8 | Di tall oil ester. |

The specific esters set forth in the above examples are merely illustrative of the invention and analogous products can be prepared by esterifying fatty acids and/or rosin acids containing at least 8 carbon atoms with other totally hydroxyalkylated alkylene polyamines such as N,N,N',N' tetrakis(1-methyl-2-hydroxypropyl)1,3-diamino-2-propanol, N,N,N',N' tetrakis(2-hydroxybutyl)1,3-diamino-2-propanol, N,N,N',N' tetrakis(2-hydroxypropyl) hexamethylene diamine, N,N,N',N' tetrakis(2-hydroxybutyl)propylene diamine, N,N,N',N' tetrakis(1-methyl-2-hydroxypropyl)ethylene diamine, N,N,N',N'',N''' pentakis(2-hydroxypropyl)diethylene triamine and N,N,N',N'', N''', N''' hexakis(2-hydroxybutyl)-triethylene tetraamine.

EXAMPLE 9

Part A

A total of 800 parts of the monooleate ester of N,N,N', N' tetrakis(2-hydroxypropyl)ethylene diamine of Example 3 and 15 mol percent (9 parts) of NaOH catalyst are charged into a stainless steel autoclave equipped with a stirrer. The reactor is heated to 125–130° C. and 200 parts of ethylene oxide are added to the reaction mixture as rapidly as it will react to prepare an oxyethylene adduct of the ester containing 20% of oxyethylene groups.

*Part B*

Part A is repeated except that the amount of ethylene oxide added is sufficient to prepare an oxyethylene adduct containing 33% of oxyethylene groups.

*Part C*

Part A is repeated except that the amount of ethylene oxide added is sufficient to prepare an oxyethylene adduct containing 50% of oxyethylene groups.

*Part D*

Part A is repeated except that the amount of ethylene oxide added is sufficient to prepare an oxyethylene adduct containing 60% of oxyethylene groups.

*Part E*

Part A is repeated except that the amount of ethylene oxide added is sufficient to prepare an oxyethylene adduct containing 67% of oxyethylene groups.

EXAMPLES 10–28

Oxyethylene adducts of the fatty acid esters of N,N,N',N' tetrakis(2-hydroxypropyl)ethylene diamine prepared in Examples 1, 2 and 4–8, inclusive, are prepared by adding varied quantities of ethylene oxide to the fatty acid esters following the procedure of Example 9. The composition of the products produced is set forth in Table II.

TABLE II

| Example No. | Intermediate Ester | Oxyethylene Content of Product, percent |
| --- | --- | --- |
| 10 | Monolaurate | 50 |
| 11 | do | 60 |
| 12 | do | 67 |
| 13 | Dilaurate | 67 |
| 14 | do | 75 |
| 15 | Dioleate | 67 |
| 16 | do | 75 |
| 17 | Monostearate | 50 |
| 18 | do | 60 |
| 19 | do | 67 |
| 20 | Distearate | 67 |
| 21 | do | 75 |
| 22 | Mono tall oil ester | 20 |
| 23 | do | 33 |
| 24 | do | 50 |
| 25 | do | 60 |
| 26 | do | 67 |
| 27 | Di tall oil ester | 67 |
| 28 | do | 75 |

EXAMPLE 29

Stable emulsions of xylene in water are prepared employing several binary mixtures of emulsifiers. The binary mixtures of emulsifiers comprise in each case a fatty acid ester of N,N,N',N' tetrakis(2-hydroxypropyl) ethylene diamine and an ethylene oxide adduct of the same fatty acid ester. The procedure is to add 2.4 grams of the binary emulsifier which is composed of 0.6 gram of the fatty acid ester and 1.8 grams of the ethylene oxide adduct of the fatty acid ester, 9.6 grams of xylene in an 8 ounce wide mouthed bottle and then stir vigorously with an electric stirrer while continuously adding 48 ml. of water dropwise over a period of 15–20 minutes. The specific mixture of emulsifiers employed in this example are set forth in Table III.

TABLE III

| Mixed Emulsifier | Composition Mixed Emulsifier | |
| --- | --- | --- |
| | Higher Fatty Ester, Product of Example No.— | Oxyethylated Adduct, Product of Example No.— |
| A | 3 | 9, Part C. |
| B | 3 | 9, Part D. |
| C | 4 | 15. |
| D | 5 | 10. |
| E | 2, Part A | 18. |
| F | 2, Part A | 19. |
| G | 2, Part B | 20. |
| H | 2, Part B | 21. |
| I | 6 | 13. |
| J | 6 | 14. |

What is claimed is:

1. A binary emulsifier consisting of about 25 weight percent of (a) an amino-ester having the formula

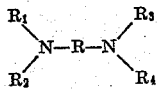

wherein $R_1$, $R_2$, $R_3$ and $R_4$ are monovalent radicals selected from the group consisting of radicals having the formulae —$CH_2CH(OH)CH_3$; —$CH_2CH(OOCR_5)CH_3$; —$CH_2CH(OH)CH_2CH_3$; —$CH_2CH(OOCR_5)CH_2CH_3$; —$CH(CH_3)CH(OH)CH_3$; and $$-CH(CH_3)CH(OOCR_5)CH_3$$

wherein in said radical formulae $R_5$ is selected from the group consisting of aliphatic hydrocarbon radicals having from 8 to 20 carbon atoms and abietyl radical, at least 1 and not more than 2 of said $R_1$, $R_2$, $R_3$ and $R_4$ radicals containing an $R_5$ radical in its structure; and wherein R is a divalent radical selected from the group consisting of alkylene radicals having 2 to 6 carbon atoms, 2-hydroxy-1,3-propylene, and radicals represented by the formula $[-R_6N(R_1)-]_n$ wherein $n$ is an integer not higher than 2, $R_6$ is a divalent radical selected from the group consisting of ethylene and propylene and $R_1$ is a monovalent radical as hereinbefore defined and (b) about 75 weight percent of the corresponding adduct of (a) with from about 50 to about 75 weight percent of ethylene oxide.

2. A binary emulsifier according to claim 1 wherein in the amino ester R is ethylene, 3 of $R_1$, $R_2$, $R_3$ and $R_4$ are —$CH_2CH(OH)CH_3$ and 1 of $R_1$, $R_2$, $R_3$ and $R_4$ is —$CH_2CH(OOCR_5)CH_3$, and $R_5$ is an aliphatic hydrocarbon radical having 8 to 20 carbon atoms.

3. A binary emulsifier according to claim 1 wherein in the amino ester R is ethylene, 2 of $R_1$, $R_2$, $R_3$ and $R_4$ are —$CH_2CH(OH)CH_3$ and 2 of $R_1$, $R_2$, $R_3$ and $R_4$ are —$CH_2CH(OOCR_5)CH_3$ and $R_5$ is an aliphatic hydrocarbon radical having from 8 to 20 carbon atoms.

4. A binary emulsifier according to claim 2 wherein in the amino ester —$OOCR_5$ represents an oleate radical and the adduct (b) contains 60 weight percent of ethylene oxide.

5. A binary emulsifier according to claim 2 wherein —$OOCR_5$ represents an oleate radical and the adduct (b) contains 67 weight percent of ethylene oxide.

6. A binary emulsifier according to claim 2 wherein in the amino ester —$OOCR_5$ represents a stearate radical and the adduct (b) contains 60 weight percent of ethylene oxide.

7. A binary emulsifier according to claim 3 wherein —$OOCR_5$ represents a stearate radical and the adduct (b) contains 75 weight percent of ethylene oxide.

8. A binary emulsifier according to claim 2 wherein in the amino ester —$OOCR_5$ represents a laurate radical and the adduct (b) contains 50 weight percent of ethylene oxide.

References Cited in the file of this patent

UNITED STATES PATENTS

| | | |
|---|---|---|
| 2,248,729 | Ulrich et al. | July 8, 1941 |
| 2,262,738 | De Groote | Nov. 11, 1941 |
| 2,366,498 | De Groote et al. | Jan. 2, 1945 |
| 2,382,612 | De Groote et al. | Aug. 14, 1948 |